United States Patent [19]
Mori et al.

[11] Patent Number: 5,880,445
[45] Date of Patent: Mar. 9, 1999

[54] METHOD OF RECORDING INFORMATION AND IMAGES IN CARD HAVING INFORMATION RECORDING PORTION AND IMAGE RECORDING PORTION

[75] Inventors: Makoto Mori, Edogawa-ku; Nobuyasu Komiya, Numazu; Yoshihiko Hotta, Mishima; Kazumi Suzuki, Suntou-gun; Masaki Yoshino, Yokohama; Akira Suzuki, Mishima, all of Japan

[73] Assignee: Ricoh Company, Ltd., Tokyo, Japan

[21] Appl. No.: 454,192

[22] PCT Filed: Oct. 19, 1994

[86] PCT No.: PCT/JP94/01764

§ 371 Date: Aug. 17, 1995

§ 102(e) Date: Aug. 17, 1995

[87] PCT Pub. No.: WO95/11494

PCT Pub. Date: Apr. 27, 1995

[30] Foreign Application Priority Data

Oct. 19, 1993 [JP] Japan ................................... 5-284433

[51] Int. Cl.$^6$ ............................ G06K 19/06; G06K 05/00
[52] U.S. Cl. ............................................. 235/380; 235/493
[58] Field of Search ................................... 235/380, 487, 235/492, 479, 381, 495; 902/23; 283/901

[56] References Cited

U.S. PATENT DOCUMENTS

| 5,504,321 | 4/1996 | Sheldon ................... 235/492 |
| 5,534,685 | 7/1996 | Takemoto et al. ....... 235/437 |
| 5,635,696 | 6/1997 | Dabrowski ............... 235/381 |

FOREIGN PATENT DOCUMENTS

| 0050897 | 2/1990 | Japan ................... 235/380 |
| 0010393 | 1/1991 | Japan ................... 235/375 |
| 404070992 | 3/1992 | Japan ................... 235/380 |
| 4070992 | 3/1992 | Japan ................... 235/380 |
| 405233957 | 9/1993 | Japan ................... 235/380 |

*Primary Examiner*—Le Then Minh
*Attorney, Agent, or Firm*—Oblon, Spivak, McClelland, Maier & Neustadt, P.C.

[57] ABSTRACT

A method of recording information in a card and reading the information therefrom and recording an image in the card by using a card reader and writer, which card has a rewritable information recording portion, and a rewritable image recording portion employing a reversible thermosensitive recording material.

20 Claims, 6 Drawing Sheets

METHOD OF RECORDING INFORMATION AND IMAGES IN CARD HAVING INFORMATION RECORDING PORTION AND IMAGE RECORDING PORTION

TECHNICAL FIELD

The present invention relates to an information and image recording method, and more particularly to a method of carrying out the recording and reading of information and the recording of an image in a card by using a card reader and writer, which card comprises a rewritable information recording portion, and a rewritable image recording portion comprising a reversible thermosensitive recording material.

BACKGROUND ART

The card comprising a rewritable information recording portion which utilizes the magnetic memory, IC chip, or optical memory has recently spread. Information is written in such a card and read therefrom using a card reader and writer equipped with a recording mechanism of recording the information in the card and a reading mechanism of reading the information recorded in the card. As this kind of card, in particular, a telephone card, a prepaid card, a cash card and the like have widely spread. In the case of any cards, however, the information recorded in the information recording portion can be recognized only through a display portion of a reading apparatus (on the side of the card reader and writer).

Recently attention has been paid to a reversible thermosensitive recording material capable of temporarily carrying out the image formation (recording) thereon and erasing the image therefrom when the image becomes unnecessary, and repeating such recording and erasure. As a representative example, there is known a reversible thermosensitive recording material in which an organic low-molecular-weight material such as a higher fatty acid is dispersed in a matrix resin such as a vinyl chloride resin (Japanese Laid-Open Patent Application 55-154198 and the like).

However, such a conventional reversible thermosensitive recording material (which will hereinafter also be referred to as "a recording material" simply) has the drawback that the surface is rubbed with the application of heat thereto and then scratched while images are formed and erased repeatedly by the application of heat, especially by use of a thermal head. When the occurrence of the scratch becomes serious, images cannot be formed uniformly.

The inventors of the present invention have proposed to provide a protective layer on the surface of the above-mentioned recording material in order to decrease the scratches on the surface caused by the use of the thermal head (Japanese Laid-Open Patent Application 63-221087, Japanese Laid-Open Patent Application 63-317385, Japanese Laid-Open Patent Application 2-566 and so on). However, it is hard to assert that the provision of the protective layer on the surface of the conventional recording material is quite enough when the recording and erasure are repeated many times.

In addition, the previously mentioned recording material in which the organic low-molecular-weight material is dispersed in the matrix resin has the drawback that when there is employed a heating system of simultaneously applying heat and pressure, such as the thermal head, the particles of the organic low-molecular-weight material tend to aggregate, thereby decreasing the contrast (the degree of milky whiteness) as the number of recording times is increasing.

In fact, such a recording material is put to practical use as a point card (with no information recording portion such as the magnetic memory) on the assumption that it is not repeatedly used so many times. Such a card is used in the following manner so far as the inventors of the present invention know:

Every time a card holder makes a purchase, a mark of ✗ is overwritten successively depending on the point corresponding to a predetermined amount of money. When the predetermined points are saved, the exchange of a commodity equivalent to the predetermined sum of money becomes possible. The card will be subjected to entire erasure when the predetermined points are awarded, and the card can be used again in the above-mentioned manner. However, according to such a manner, the card holder cannot know instantly how many points he has been awarded at present, and in addition, the card cannot be used for other purposes such as transmission of various information because the mark of ✗ is merely overwritten, so that the card is lacking in convenience.

It is therefore an object of the present invention to provide an information and image recording method, with the life of a card which comprises a rewritable information recording portion and an image recording portion comprising a reversible thermosensitive recording material being drastically increased.

Another object of the present invention is to provide an information and image recording method, capable of readily recognizing the information recorded in the image recording portion comprising the reversible thermosensitive recording material.

DISCLOSURE OF INVENTION

The present invention relates to an information and image recording method of recording information in a card and reading the information therefrom and recording an image in the card by using a card reader and writer, which card comprises a rewritable information recording portion, and a rewritable image recording portion comprising a reversible thermosensitive recording material, and this method is characterized in that the number of times when the information is rewritten in the information recording portion is counted, and the image in the image recording portion is rewritten when the number of information rewriting times reaches a predetermined number of times.

In addition, the present invention relates to an information and image recording method of recording information in a card and reading the information therefrom and recording an image in the card by using a card reader and writer, which card comprises a rewritable information recording portion, and a rewritable image recording portion comprising a reversible thermosensitive recording material, and this method is characterized in that specific quantity information to be recorded in the information recording portion is monitored, and the rewriting of the image recording portion is carried out when the above-mentioned quantity information reaches a predetermined value.

In addition, the present invention relates to an information and image recording method of recording information in a card and reading the information therefrom and recording an image in the card by using a card reader and writer, which card comprises a rewritable information recording portion, and a rewritable image recording portion comprising a reversible thermosensitive recording material, and this method is characterized in that the timing of rewriting the image in the image recording portion is previously set, and the rewriting of the image recording portion is carried out at the above-mentioned rewriting timing.

Furthermore, the present invention relates to a method of recording information in a card and reading the information therefrom and recording an image in the card by using a card reader and writer, which card comprises a rewritable information recording portion, and a rewritable image recording portion comprising a reversible thermosensitive recording material, and this method is characterized in that among a variety of information to be recorded in the information recording portion specific quantity information or the processed information thereof is recorded in the image recording portion.

BEST MODE FOR CARRYING OUT THE INVENTION

The present invention will now be further explained in detail.

The object of the present invention is an information and image recording method of recording information in a card and reading the information therefrom and recording an image in the card by using a card reader and writer, which card comprises a rewritable information recording portion, and a rewritable image recording portion comprising a reversible thermosensitive recording material. By adopting any of the following manners the life of the card can be drastically increased.

(I) The number of times when the information is rewritten in the information recording portion is counted, and the image in the image recording portion is rewritten when the number of information rewriting times reaches a predetermined number of times.

(II) The specific quantity information to be recorded in the information recording portion is monitored, and the rewriting of the image recording portion is carried out when the above-mentioned quantity information reaches a predetermined value.

(III) The timing of rewriting the image in the image recording portion is previously set, and the rewriting of the image recording portion is carried out at the above-mentioned rewriting timing.

Furthermore, the object of the present invention is a method of recording information in a card and reading the information therefrom and recording an image in the card by using a card reader and writer, which card comprises a rewritable information recording portion, and a rewritable image recording portion comprising a reversible thermosensitive recording material, and this method is characterized in that among a variety of information to be recorded in the information recording portion specific quantity information or the processed information thereof is recorded in the image recording portion.

In the specification a card-shaped recording medium is called a card, but the card includes a sheet-shaped one.

Figure 1:
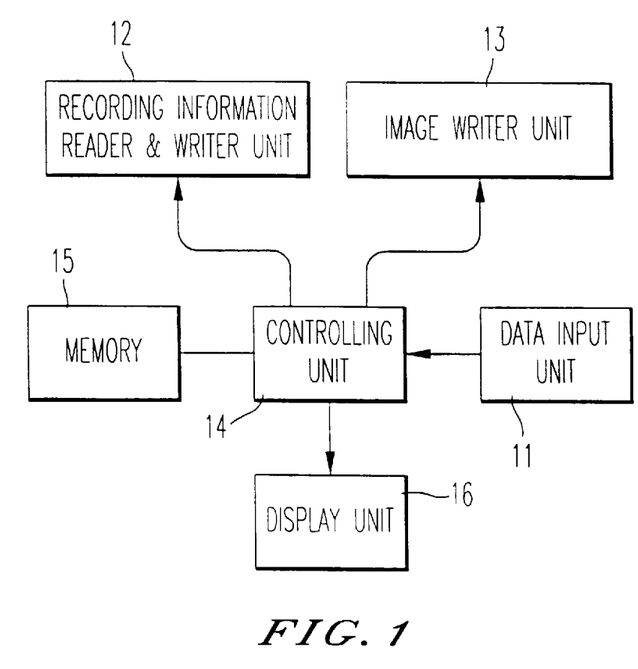
FIG. 1 is a schematic block diagram which shows a structural example of a card reader and writer used for carrying out the present invention.

As a reader and writer for a card, there is employed in the present invention a card reader and writer equipped with an image forming function of a thermal head or the like in addition to the conventional functions, thereby recording information in the information recording portion and reading the same therefrom, and recording an image in the image recording portion. The structural example of such a card reader and writer is schematically illustrated in FIG. 1. This card reader and writer comprises a data input unit 11 employing the conventional input means for inputting the data, such as a numeric key, a keyboard or a mouse; a recording information reader and writer unit 12 equipped with functions of recording a recording information in an information recording portion of a card and reading the recording information from the information recording portion of the card; an image writer unit 13 having a function of recording an image in an image recording portion of the card; a controlling unit 14 for controlling each unit and carrying out various operations; a memory 15 comprising RAM and ROM; and a display unit 16 for carrying out the display on an operating screen. This apparatus can be connected to an external host computer.

According to the above-mentioned method (I), for example, it is designed to rewrite the image in the image recording portion once each time the information is rewritten in the information recording portion three times. It is previously set in the reader and writer side how many times to rewrite the information before the rewriting of the image. As a matter of course, the ratio of both numbers of times can be optionally set. The number of times when the information is rewritten in the information recording portion is updated and recorded each time the information is rewritten in the information recording portion, and such a number of times will be read by the reader and writer when the card is used the next time. Then, it is judged whether the value obtained by adding 1 to the present number of times is equal to the predetermined number of times previously set in the reader and writer side, or not. When the value is not equal to the predetermined number of times, the controlling unit 14 of the reader and writer issues a recording order only to the recording information reader and writer unit 12. When the value is equal to the predetermined number of times, the recording orders are issued both to the recording information reader and writer unit 12 and the image writer unit 13. Thus, it is possible to cause the life of the card to drastically increase.

According to the previously mentioned method (II), instead of counting the number of rewriting times of the information in the information recording portion and controlling the timing of rewriting the image in the image recording portion as in the above-mentioned method (I), the specific quantity information to be recorded in the information recording portion is monitored and the rewriting of the image recording portion is carried out when the above-mentioned quantity information reaches a predetermined value. The specific quantity information is, for instance, a sum of money for the purchase of goods in the case where the card is utilized as the point card. The kind of specific quantity information is appropriately selected depending upon the application of the card as a matter of course. This makes it possible to drastically increase the life of the card.

According to the previously mentioned method (III), the timing of rewriting the image in the image recording portion is previously set, and the rewriting of the image recording portion is carried out at the aforementioned rewriting timing. For example, it is designed to rewrite commercial information in the image recording portion at a predetermined interval. In this method, by causing the above-mentioned interval to correspond to a period of time while the number of rewriting times of the information recording portion of the card reaches a plurality of times, the life of the card can be drastically increased.

In the present invention information which is relative and/or irrelative to the information to be recorded in the information recording portion can be recorded in the image recording portion.

In addition, a part of the rewritable image recording portion is made a write-once recording area, where the write-once recording may be carried out.

Furthermore, the area of an image recording area and/or the image recording position in the image recording portion may be appropriately changed.

In addition to the rewritable image recording portion an image recording portion comprising a nonreversible recording material may be provided to carry out the nonreversible recording there.

Further, the information recording portion may employ magnetic memory, optical memory or IC memory, and other types of memory are usable.

It may also be possible to calculate the specific quantity information to be newly recorded in the information recording portion in terms of the number of points, and add the number of newly obtained points to the number of previously obtained points which is read from the information recording portion, and carry out the rewriting of the image recording portion when the number of total points reaches a predetermined value.

Further, it may also be possible to calculate the value which is obtained by adding an accumulated value of the specific quantity information read from the information recording portion to specific quantity information to be newly added in terms of the number of points, and carry out the rewriting of the image recording portion when the number of points reaches a predetermined value.

Furthermore in the present invention, among a variety of information to be recorded in the information recording portion, specific quantity information or the processed information thereof may be recorded in the image recording portion. The specific quantity information is such information as the balance in the case where the card is a prepaid card; as the residual amount in the case of a customer's bottle card; and as the remaining call-rate in the case of a telephone card. The processed information of the specific quantity information is such information as the number of accumulated points in the case where the card is a point card.

The present invention will now be explained in detail by referring to the specific examples.

Figure 2A:
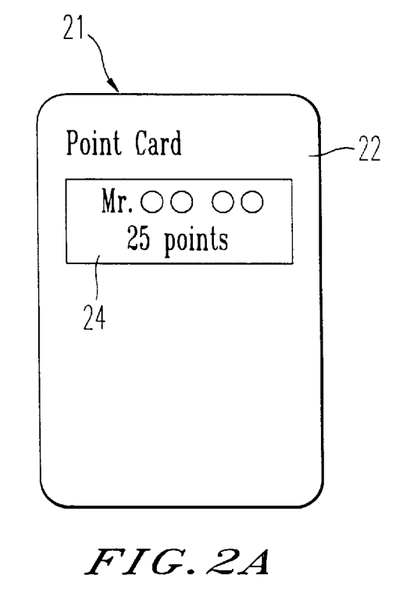
FIG. 2a–b are views of a card which is useful for carrying out the present invention; and 2(a) is a view showing one example of an image recording portion provided on the front side of the card and 2(b) is a view showing one example of an information recording portion provided on the rear side thereof.
Figure 2B:
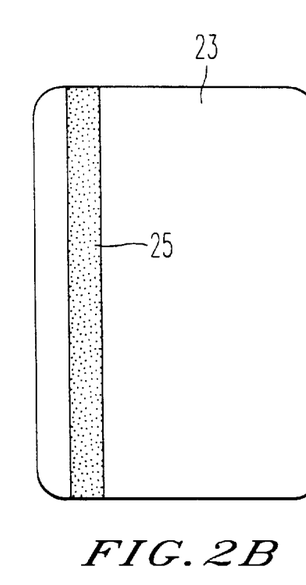

FIG. 2 is a schematic view showing one example of a card which is useful for carrying out the present invention. As shown in the same figure (a) the front side 22 of a card 21 bears an image recording portion 24 comprising a reversible thermosensitive recording material; and as shown in the same figure (b) the rear side 23 of the card 21 bears an information recording portion comprising magnetic memory 25.

Figure 3:
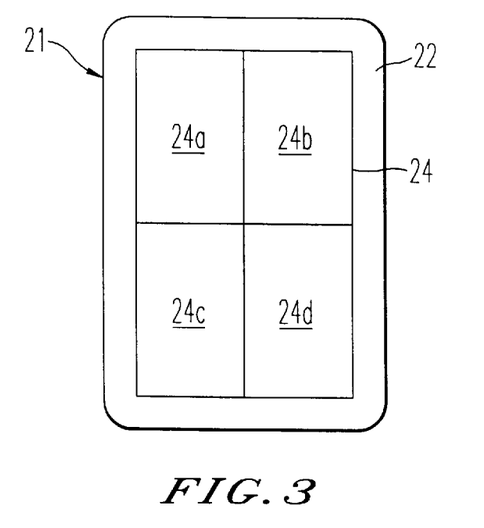
FIG. 3 is a view showing another example of the front side of a card which is useful for carrying out the present invention.
Figure 4A:
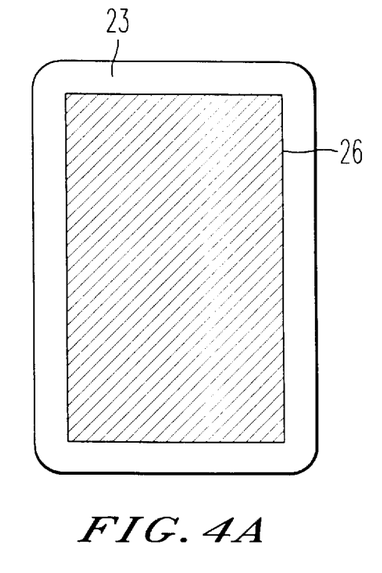
FIGS. 4(a) and (b) are views showing another examples of the rear side of a card which is useful for carrying out the present invention.
Figure 4B:
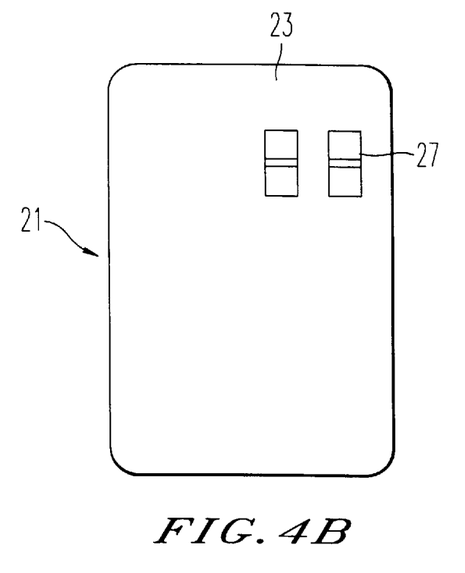

In the card for use in the method of the present invention the number of recording areas (recording positions) in the image recording portion comprising the reversible thermosensitive recording material may not be one, as shown in FIG. 2(*a*), but can be optionally determined. FIG. 3 shows one example having 4 recording areas (24*a*–24*d*). In addition, the information recording portion can employ the optical memory or IC chip instead of the magnetic memory. FIGS. 4(*a*) and (*b*) show the examples which respectively employ optical memory 26 and IC chip 27 for the information recording portion.

For example, in accordance with the example as shown in FIG. 3 (provided that the rear side is as shown in FIG. 2(*b*)), it is designed to carry out the writing in the recording area 24*a* of the image recording portion 24 only when the memory operation has been carried out 25 times in the information recording portion 25. In fact, it is not until 25 times that the writing is carried out in the recording area 24*a*, and thereafter the writing is started in the recording area 24*b* when the memory operation has been carried out 50 times. Accordingly, after the memory operation has been carried out in the information recording portion 25 100 times in total, the writing is first carried out in all the recording areas 24*a*, 24*b*, 24*c* and 24*d* of the image recording portion 24.

As a material for the image recording portion for use in the present invention, any material capable of reversibly changing its transparency or color tone depending on the heat can be employed. For instance, there can be employed a material which comprises two or more kinds of polymers in combination, and is capable of changing between the transparent state and the white opaque state by the difference in compatibility (Japanese laid-Open Patent Application 61-258853); a material utilizing the phase change of a liquid crystal polymer (Japanese Laid-Open Patent Application 62-66990); and a material capable of assuming a first color at a specific first temperature higher than room temperature, and assuming a second color when the material is heated to a specific second temperature higher than the specific first temperature, and then cooled.

In particular, the material capable of changing its color condition at the specific first temperature and the specific second temperature is preferably employed. As such examples, there are employed a material which assumes a transparent state at a specific first temperature and a white opaque state at a specific second temperature (Japanese Laid-Open Patent Application 55-154198); a material which assumes a coloring state at a specific second temperature and is decolorized at a specific first temperature (Japanese Patent Application 2-414438); a material which assumes a white opaque state at a specific first temperature and a transparent state at a specific second temperature (Japanese Laid-Open Patent Application 3-169590); and a material which assumes a black, red or blue color at a specific first temperature and is decolorized at a specific second temperature (Japanese Laid-Open Patent Application 2-188293 and Japanese Laid-Open Patent Application 2-188294).

Of these, the material which comprises the organic low-molecular-weight material dispersed in the matrix resin and assumes a transparent state at the specific first temperature and a white opaque state at the specific second temperature is preferably employed from the viewpoints of sensitivity and durability (Japanese Laid-Open Patent Application 63-39378, Japanese Laid-Open Patent Application 63-130380 and Japanese Laid-Open Patent Application 2-1363; specifications such as Japanese Patent Application 63-14754 and Japanese Patent Application 1-140109; and Japanese Laid-Open Patent Application 64-14079, Japanese Laid-Open Patent Application 3-7377, Japanese Laid-Open Patent Application 63-221087, Japanese Laid-Open Patent Application 63-317385, Japanese Laid-Open Patent Application 2-566, Japanese Laid-Open Patent Application 4-85077, Japanese Laid-Open Patent Application 1-138781, Japanese Laid-Open Utility Model Application 2-3876 and Japanese Laid-Open Patent Application 2-130188).

According to the previous explanation based on FIG. 3, there is employed a method of carrying out the erasure and writing again in turn from the recording position 24a after the 100 times in the aggregate. As mentioned above, the recording is carried out at one recording position, with taking the 25 times' memory operations as a unit for convenience. The number 25 is set for convenience, and any prefixed arbitrary number of times may be used.

Figure 5A:
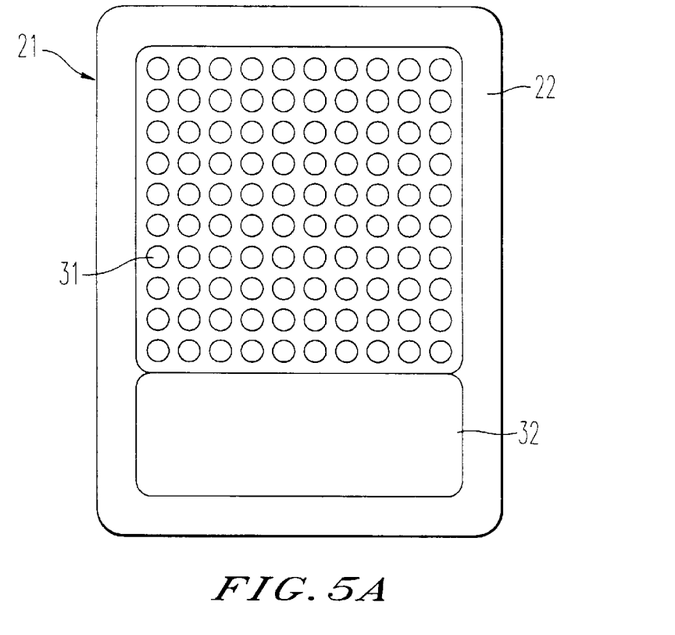
FIGS. 5(a) and (b) are views showing a further example of the front side of a card which is useful for carrying out the present invention, in explanation of a manner of using the card.
Figure 5B:
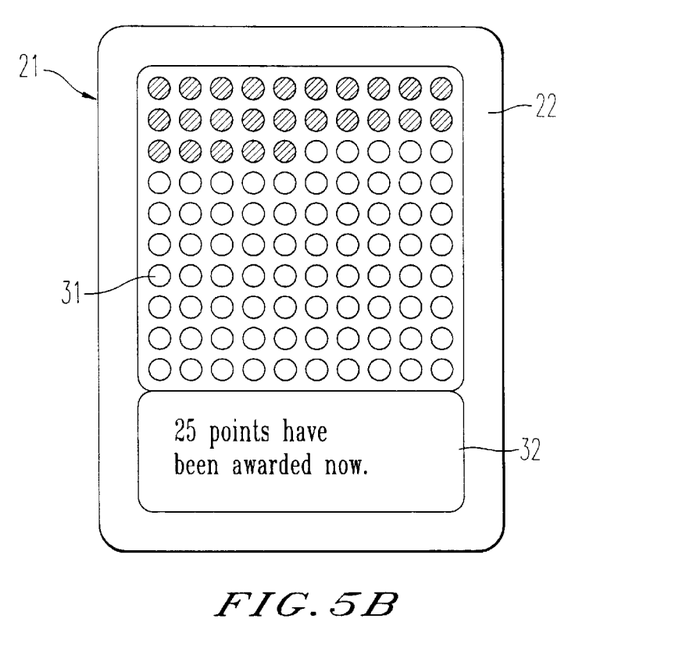

FIGS. 5(a) and (b) show a card 21 of which front side 22 bears thereon a write-once recording portion 31 and a rewritable recording portion 32 (the rear side is the same as that shown in FIG. 2(b)). A mark is put (oblique lines are drawn in a circle) per point in this example, but it is difficult to recognize with a single glance how many points have there been at present when a lot of marks are additionally written one after another. Then, the rewritable recording portion 32 may be designed so as to print the outline there for the criterion. For example, suppose that there is provided in the write-once recording portion 31 a space for the marks of 10 rows by 10 columns. Suppose that when the marks are printed the predetermined number of times in the write-once recording portion 31, some rewriting is carried out or letters are newly written in the rewritable recording portion 32. FIG. 5(b) shows an example where 25 marks are printed. Then, the time when the entire area of the write-once recording portion 31 is subjected to printing, that is, 100 marks are printed, is regarded as the time of completion.

To be more specific, when 25 marks are printed in the write-once recording portion 31, a phrase, for example, "25 points have been awarded now." is displayed in the rewritable recording portion 32 (FIG. 5(b)). Further, when 25 marks are additionally printed in the write-once recording portion 31 (namely, 50 points are printed in total), the previously printed phrase is erased and a phrase, for example, "You are halfway there. Don't give up." is newly printed. After such a manner is continued, a final phrase, for example, "Congratulations! You have just been awarded all the points." is newly printed in the rewritable recording portion 22 when 100 marks are printed in total in the write-once recording portion. As a matter of course the rewriting is carried out in the information recording portion 25 every time the card is used.

Figure 6A:
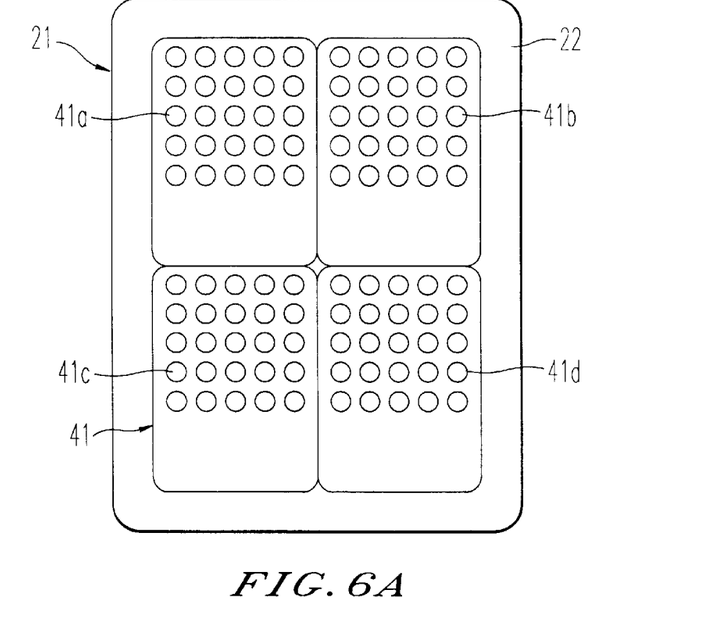
FIGS. 6(a) and (b) are views showing a still another example of the front side of a card which is useful for carrying out the present invention, in explanation of a manner of using the card.
Figure 6B:
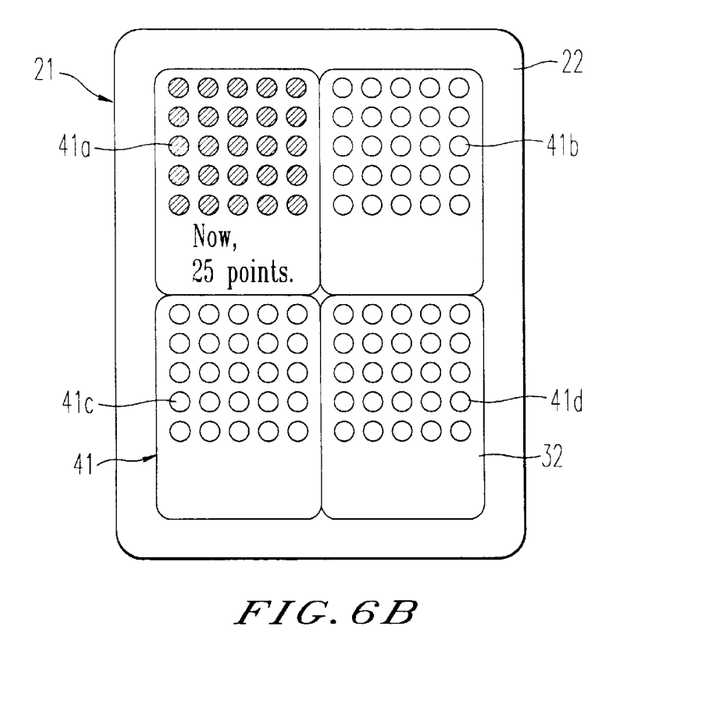

FIGS. 6(a) and (b) show an example where four recording areas (recording positions) 41a, 41b, 41c and 41d are formed in an image recording portion 41 (the rear side of a card is the same as that shown in FIG. 2(b)). The number of recording areas may be any arbitrary number except four as a matter of course, but a large number is preferable. Now, the recording is repeatedly carried out in the recording area 41a a predetermined number of times. Next, the printing position is shifted to the recording area 41b, and the printing is repeatedly carried out a predetermined number of times in a similar manner. Thereafter, the recording is carried out similarly in each of the recording areas 41c and 41d. As for how to treat the recording area in which the repeated printing has been already carried out (that means the recording area 41a when the recording is carried out in 41b, 41b when in 41c, and 41c when in 41d), the area may be subjected to the entire erasure operation or the previous printing may be allowed to remain as it is. In addition, the recording area to be subjected to printing is not always shifted in numerical order, but the order can be set freely. The rewriting of the information recording portion 25 is carried out every time the card is used as a matter of course.

A more specific example is given for illustration, as in FIG. 6(b), and there are provided in each of the recording areas 41a, 41b, 41c and 41d an upper portion where, for example, 25 marks can be recorded, and a lower portion where a phrase or the like that is relative to the item recorded in the above-mentioned upper portion can be placed.

First, the printing is started from the recording area 41a, and for instance, when 25 marks are recorded in the upper portion thereof, such a phrase as "Now, 25 points." will be placed in the lower portion. Thereafter, the recording area is shifted to 41b. The marks are printed in the recording area 41b in the same way as above, and when 25 marks are printed here, a phrase, for instance, "You are halfway there. Don't give up." will be placed in the lower portion. The printing is carried out in 41c and 41d likewise, but the recording area 41d is designed to previously place a phrase therein, for example, "When this section is completed, you will be awarded full points." in the lower portion thereof before the marks are printed in the upper portion. Finally, when all the marks are printed in the upper portion of the last recording area 41d, a phrase, such as "Congratulations! You have just been awarded all the points." will be placed in the lower portion.

According to the previously explained contents, a limited image recording portion comprising the reversible thermosensitive recording material is effectively employed to improve the durability thereof. Its performance can be therefore utilized far better as compared with the case where a method of simply repeating the printing and erasing operations of the entire area is adopted, as generally employed.

Figure 7:
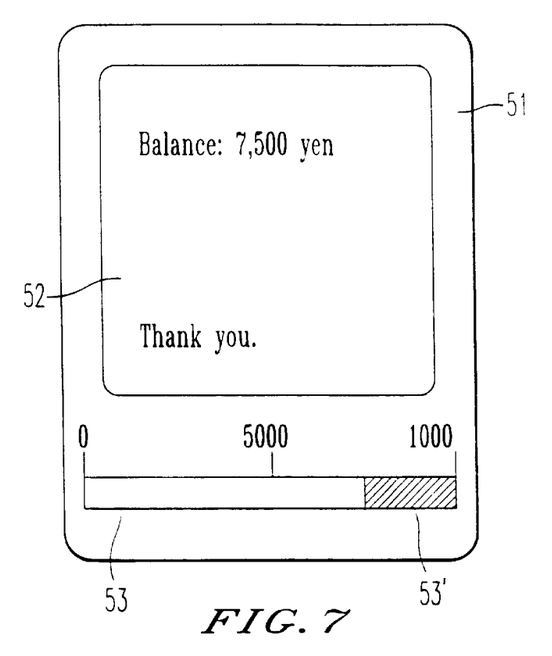
FIG. 7 is a view showing a still another example of the front side of a card which is useful for carrying out the present invention, in explanation of a manner of using the card.

FIG. 7 shows an example where an image recording portion comprising a nonreversible thermosensitive recording material is partially provided on a card (the rear side of which is the same as that shown in FIG. 2(b)). Reference numeral 51 indicates a card; 52, an image recording portion comprising a reversible thermosensitive recording material; 53, an image recording portion comprising a nonreversible recording material; and 53', a recorded portion. In the example shown in FIG. 7, let it be supposed for convenience that the card is used as a prepaid card of 10,000 yen, and it is designed to display the exact balance on the image recording portion 53 comprising a reversible thermosensitive recording material. Every time the card 51 is used, the sum of spent money is subtracted and the display of the balance on the image recording portion 53 comprising the reversible thermosensitive recording material is rewritten. At the same time, it is designed to overwrite and display the sum of spent money in the form of a bar graph in the image recording portion 53' comprising a nonreversible thermosensitive recording material. As a matter of course it is possible to use a prepaid card without any image recording portion 53' comprising the nonreversible thermosensitive recording material.

In addition, the card can be used in such a manner that the name of the user is recorded in the image recording portion 53 comprising the nonreversible thermosensitive recording material to make the user's private card, for example, as a point card or a prepaid card. It is possible to use such a card again after the completion of points or the absence of balance by erasing the information about the occupation of the information recording portion and the recordings in the rewritable recording portion and the write-once recording portion.

Figure 8:
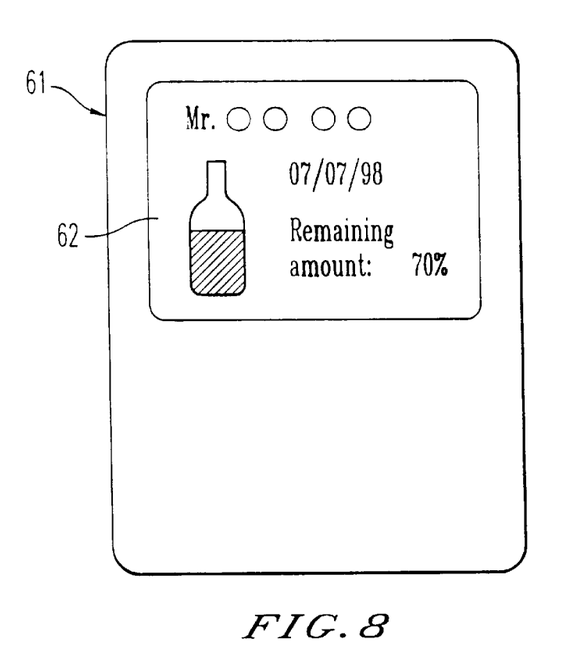
FIG. 8 is a view showing a still another example of the front side of a card which is useful for carrying out the present invention, in explanation of a manner of using the card.

Furthermore, FIG. 8 shows an example where a card is used as a customer's bottle card, (the rear side of which is the same as that shown in FIG. 2(*b*)). Reference numeral 61 indicates a card, and 62 indicates an image recording portion comprising a reversible thermosensitive recording material. A variety of information including the ID number and the name of a card holder, and the amount of the contents remaining in the bottle are recorded in an information recording portion 25 on the rear side of the card, and the specific information such as the amount of contents remaining in the bottle, which the card holder wants to know first of all, is recorded in the image recording portion 62 every time the card is used. "The reversible thermosensitive recording material" used in the image recording portion of a card for use in the present invention is a material which reversibly causes a visual change depending on its temperature. The visual change includes a change in color condition and a change in shape. In the present invention, a material causing a change in color condition is mainly employed. The change of color condition is caused by the changes of light transmittance, light reflectance, absorption wavelength and the scattering degree, and the indication of the reversible thermosensitive recording material for practical use is made by the combination of the above-mentioned changes. To be more specific, any material capable of reversibly changing its transparency or color tone depending on the heat can be employed. For instance, there can be employed a material capable of assuming a first color at a specific first temperature higher than room temperature, and assuming a second color when the material is heated to a specific second temperature higher than the specific first temperature, and then cooled.

In particular, the material capable of changing the color condition at the specific first temperature and the specific second temperature is preferably employed. As such examples, there can be employed a material which assumes a transparent state at a specific first temperature and a white opaque state at a specific second temperature (Japanese Laid-Open Patent Application 55-154198); a material which induces color development at a specific second temperature and is decolorized at a specific first temperature (Japanese Laid-Open Patent Application 4-224996, Japanese Laid-Open Patent Application 4-247985 and Japanese Laid-Open Patent Application 4-267190); a material which assumes a white opaque state at a specific first temperature and a transparent state at a specific second temperature (Japanese Laid-Open Patent Application 3-169590); and a material which assumes a black, red or blue color at a specific first temperature and is decolorized at a specific second temperature (Japanese Laid-Open Patent Application 2-188293 and Japanese Laid-Open Patent Application 2-188294).

Of these the following two materials are given as the representative examples:

① A material of which transparent and white opaque states reversibly change; and ② A material in which a color of a dye or the like chemically causes a change.

As for the material ①, there is shown as the representative example a material comprising a support and a thermosensitive layer (reversible thermosensitive recording layer), formed thereon, in which an organic low-molecular-weight material such as a higher alcohol or a higher fatty acid is dispersed in a matrix resin such as polyester, as previously explained many times as well as in the prior art. A representative example of the material ② is a leuco-type thermosensitive recording material with the reversibility intensified.

The thermosensitive layer of the above-mentioned type ① (which constitutes the recording positions 24*a*, 24*b* and the like), capable of causing the change in its transparency, comprises as the main components a matrix resin and an organic low-molecular-weight material dispersed in the matrix resin. The reversible thermosensitive recording material for use in the present invention has a temperature range where it assumes a transparent state, as described later.

In addition, the reversible thermosensitive recording material for use in the present invention utilizes the change in transparency (transparent state and milky white opaque state), as previously mentioned, and the difference between the transparent state and the milky white opaque state is considered as follows:

Namely, in the transparent state (I) the particles of the organic low-molecular-weight material dispersed in the matrix resin are closely attached to the matrix resin without any gap, and there is no air space in the particles, so that the light which enters one side passes through to the opposite side without being scattered. Thus, the material appears transparent. In the milky white opaque state (II) the particles of the organic low-molecular-weight material consist of fine crystals of the organic low-molecular-weight material, and gaps are formed at the interface of the crystals or the interface between the particles and the matrix resin, so that the light which enters one side is refracted and scattered at the interface between the air gap and the crystal, and the interface between the air gap and the resin. Thus, the material appears white.

Figure 9:
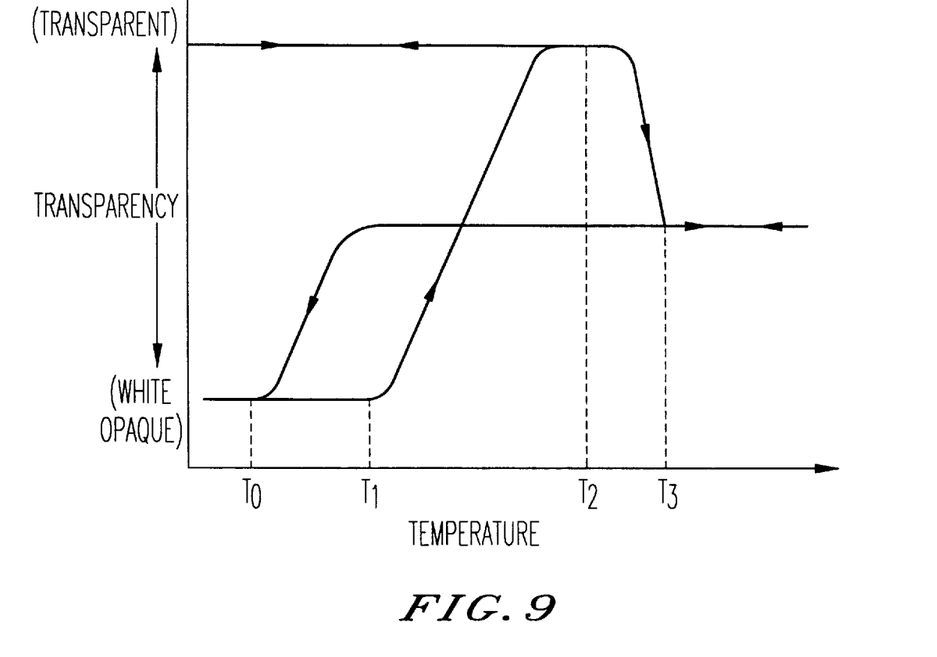
FIG. 9 is a graph which shows the change in transparency of a reversible thermosensitive recording material depending on the heat.

In FIG. 9 (indicating the change in transparency depending on heat), a thermosensitive layer comprising as the main components a matrix resin and an organic low-molecular-weight material dispersed in the matrix resin assumes a milky white opaque state, for example, at room temperature of $T_0$ or less.

With heating it, it starts to become transparent little by little from a temperature $T_1$, and it becomes transparent first when heated to a temperature from $T_2$ to $T_3$. When the thermosensitive layer under such a condition is again returned to room temperature of $T_0$ or less, the transparent state is maintained. It is considered that this is because the resin begins to soften from the temperature about $T_1$ and the resin contracts with the progress of softening, thereby decreasing an air gap on the interface between the resin and the organic low-molecular-weight material or an air gap in the particles. Therefore, the transparency is gradually increasing. The organic low-molecular-weight material becomes semi-melted state within a temperature range from $T_2$ to $T_3$, and the layer appears transparent by filling the remaining air gaps with the melted organic low-molecular-weight material. Thereafter, the organic low-molecular-weight material is cooled with a seed crystal being left, and crystallizes out at a relatively high temperature. At that time, the resin is still in the softened condition, so that the resin keeps up with the volume change of the particles caused by the crystallization thereof, and accordingly, no gap is generated and the transparent state can be thus maintained.

When the thermosensitive layer is further heated to a temperature $T_4$ or more, it assumes a semitransparent state between the maximum transparency and the maximum opacity. Next, with decreasing the temperature, it returns to the original milky white opaque state, without passing through the transparent state. It is considered that this is because after the organic low-molecular-weight material is completely melted at a temperature $T_4$ or more, it falls into a supercooled condition and crystallizes out at a temperature slightly higher than $T_0$, and at that time, the resin cannot keep up with the volume change caused by the crystallization, thereby generating some air gaps.

Therefore, it is possible to form a white opaque image on a transparent background or a transparent image on a white opaque background by selectively applying heat to the thermosensitive layer to selectively heat the same, and such a change can be repeated many times.

In addition, by disposing a colored sheet on the back of such a thermosensitive layer it is possible to form an image assuming a color of the colored sheet on the white background, or a white image on the background with a color of the colored sheet. Further, when the image in this reversible thermosensitive recording material is used as a reflection image, the contrast can be increased by providing a layer capable of reflecting the light on the back of the recording layer even though the thickness of the recording layer is decreased. To be more specific, deposition of Al, Ni, Sn or the like is possible.

To prepare a reversible thermosensitive recording card of this type for use in the present invention, in general, (1) a solution in which two components of the matrix resin and the organic low-molecular-weight material are dissolved or (2) a dispersion in which the organic low-molecular-weight material in the form of finely-divided particles is dispersed in a solution of the matrix resin (employing a solvent in which at least one kind of organic low-molecular-weight material is not dissolved) may be coated on a support, for example, a plastic film, a glass plate or a metallic plate (in particular, the plastic film is advantageous) and dried to form a thermosensitive layer.

The solvent for preparation of the thermosensitive layer or the thermosensitive recording card can be variously selected depending upon the kinds of matrix resin and organic low-molecular-weight material. For example, there can be employed tetrahydrofuran, methyl ethyl ketone, methyl isobutyl ketone, chloroform, carbon tetrachloride, ethanol, toluene and benzene. When the thermosensitive layer is obtained by using the solution, not to mention the dispersion, the organic low-molecular-weight material separates out in the form of finely-divided particles and exists in the dispersed condition in the thermosensitive layer obtained.

The matrix resin for use in the thermosensitive layer is a material not only for forming a layer in which the organic low-molecular-weight material is uniformly dispersed and held therein, but also affecting the transparency in the maximum transparent state. Therefore, a resin with good transparency, mechanical stability and good film-forming properties is preferable as the matrix resin.

As such a resin there can be employed polyvinyl chloride and vinyl chloride copolymers such as vinyl chloride-vinyl acetate copolymer, vinyl chloride-vinyl acetate-vinyl alcohol copolymer, vinyl chloride-vinyl acetate-maleic acid copolymer, and vinyl chloride-acrylate copolymer; polyvinylidene chloride and vinylidene chloride copolymers such as vinylidene chloride-vinyl chloride copolymer, and vinylidene chloride-acrylonitrile copolymer; polyester; polyamide; polyacrylate, polymethacrylate or acrylate-methacrylate copolymer; and silicone resin. These can be used alone, or two or more kinds may be used in combination.

As for the organic low-molecular-weight material, materials which are changeable from the polycrystalline state to the single crystalline state in the recording layer by the application of heat thereto are usable, and in general, materials with a melting point of about 30° to 200° C., preferably about 50° to 150° C. are employed. As such organic low-molecular-weight materials, there can be employed alkanols; alkane diols; halogenated alkanols or halogenated alkane diols; alkylamines; alkanes; alkenes; alkynes; halogenated alkanes; halogenated alkenes; halogenated alkynes; cycloalkanes; cycloalkenes; cycloalkynes; saturated or unsaturated mono- or di-carboxylic acids, or esters, amides or ammonium salts thereof; saturated or unsaturated halogenated fatty acids, or esters, amides or ammonium salts thereof; arylcarboxylic acids, or esters, amides or ammonium salts thereof; halogenated allylcarboxylic acids, or esters, amides or ammonium salts thereof; thioalcohols; thiocarboxylic acids, or esters, amines or ammonium salts thereof; and carboxylates of thioalcohols. These can be used alone, or two or more kinds may be used in combination. The number of carbons in these compounds is 10 to 60, preferably 10 to 38, more preferably 10 to 30. Part of the alcohol group in the ester moiety may be saturated or not, and substituted by a halogen. In any case, it is preferable that the organic low-molecular-weight material be a compound comprising in its molecule at least one kind selected from the group consisting of oxygen, nitrogen, sulfur and a halogen, for example, —OH, —COOH, —CONH—, —COOR, —NH—, —NH$_2$, —S—, —S—S—, —O—, or a halogen.

To be further more specific, there can be used as these compounds higher fatty acids such as lauric acid, dodecanoic acid, myristic acid, pentadecanoic acid, palmitic acid, stearic acid, behenic acid, nonadecanoic acid, arachic acid and oleic acid; esters of higher fatty acids such as methyl stearate, tetradecyl stearate, octadecyl stearate, octadecyl laurate, tetradecyl palmitate and dodecyl behenate; and ethers and thioethers such as Of these, in the present invention, the higher fatty acids, particularly, the higher fatty acids having 16 or more carbon atoms such as palmitic acid, stearic acid, behenic acid and lignoceric acid are preferable, and the higher fatty acids having 16 to 24 carbon atoms are more preferable.

To increase the temperature region where the thermosensitive layer is made transparent, the organic low-molecular-weight materials described in the present specification may be appropriately used in combination, or such organic low-molecular-weight materials and other materials having different melting points may be used in combination. They are disclosed in, for instance, Japanese Laid—Open Patent Application 63-39378 and Japanese Laid—Open Patent Application 63-130380, and specifications such as Japanese Patent Application 63-14754 and Japanese Patent Application 1-140109, but not limited thereto.

It is preferable that the ratio by weight of the organic low-molecular-weight material to the matrix resin in the thermosensitive layer be in a range of about 2:1 to 1:16, more preferably 1:2 to 1:8. When the ratio of the matrix resin is below the above-mentioned value, it is difficult to form a layer in which the organic low-molecular-weight material is held in the matrix resin. When its ratio is more than the above-mentioned value, it is difficult to make the thermosensitive layer opaque because of a small amount of the organic low-molecular-weight material.

In addition to the above-mentioned components, additives such as a surface active agent and a high-boiling point solvent may be added to the thermosensitive layer to facilitate the formation of transparent images. The specific examples of these additives are as follows: Examples of the high-boiling point solvent;

Tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol di-2-ethyl butyrate, methyl acetylricinoleate, butyl acetylricinoleate, butylphthalyl butyl glycolate, and tributyl acetylcitrate.

Examples of the surface active agent and other additives;

Polyhydric alcohol higher fatty acid esters; polyhydric alcohol higher alkyl ethers; lower olefin oxide adducts of polyhydric alcohol higher fatty acid ester, higher alcohol, higher alkyl phenol, higher alkylamine of higher fatty acid, amide of higher fatty acid, fat and oil, or polypropylene glycol; acetylene glycol; Na, Ca, Ba or Mg salts of higher alkyl benzenesulfonic acid; Ca, Ba or Mg salts of higher fatty acid, aromatic carboxylic acid, higher aliphatic sulfonic acid, aromatic sulfonic acid, sulfuric monoester, or phosphoric monoester or diester; lower sulfated oil; long-chain polyalkyl acrylate; acrylic oligomer; long-chain polyalkyl methacrylate; copolymer of long-chain alkyl methacrylate and amine-containing monomer; styrene-maleic anhydride copolymer; and olefin-maleic anhydride copolymer.

Furthermore, a protective layer may be formed on the thermosensitive layer to protect the thermosensitive layer.

As the material for the protective layer (with a thickness of 0.1 to 5 μm), a silicone rubber, a silicone resin (described in Japanese Laid—Open Patent Application 63-221087), a polysiloxane graft polymer (described in Japanese Patent Application 62-152550), and an ultraviolet-curing resin or electron radiation-curing resin (described in Japanese Patent Application 63-310600) can be employed. A solvent is employed for coating in any case, and it is desirable that the resin and the organic low-molecular-weight material for use in the thermosensitive layer be not easily dissolved in such a solvent.

As the solvent in which the resin and the organic low-molecular-weight material for use in the thermosensitive layer are not easily dissolved, there can be employed n-hexane, methyl alcohol, ethyl alcohol, and isopropyl alcohol. In particular, the alcohol-based solvents are desirable from the viewpoint of cost.

Further, an intermediate layer may be interposed between the protective layer and the thermosensitive layer to protect the thermosensitive layer from the solvent or a monomer component for use in the protective layer formation liquid. As the material for the intermediate layer, in addition to the same resins as those shown as the matrix resins for use in the thermosensitive layer, the following thermosetting resins and thermoplastic resins can be used. Namely, there can be used polyethylene, polypropylene, polystyrene, polyvinyl alcohol, polyvinyl butyral, polyurethane, saturated polyester, unsaturated polyester, epoxy resin, phenolic resin, polycarbonate, and polyamide.

It is preferable that the thickness of the intermediate layer be in a range of about 0.1 to 2 μm.

Next, the thermosensitive layer comprising the above-mentioned material ②, that is, a reversible thermosensitive coloring composition which utilizes the coloring reaction between an electron donor type coloring compound and an electron acceptor type compound will now be described.

The reversible thermosensitive coloring composition utilizing the coloring reaction between the electron donor type coloring compound and the electron acceptor type compound, utilizes the phenomenon that an amorphous coloring material is generated when the electron donor type coloring compound and the electron acceptor type compound are mixed and fused under the application of heat thereto; and on the other hand, the electron acceptor type compound causes crystallization and the above-mentioned coloring material is decolorized when the amorphous coloring material is heated to a temperature lower than the above-mentioned fusing temperature.

The thermosensitive coloring composition instantaneously induces color development by the application of heat thereto, and the color development state is maintained in a stable condition at room temperature. On the other hand, the composition in the color development state is abruptly decolorized when heated to a temperature which is the color development temperature or less, and the decolorization state is maintained in a stable condition at room temperature. Such a unique reversible color development and decolorization behavior is a surprising novel phenomenon which has never been seen before.

Figure 10:
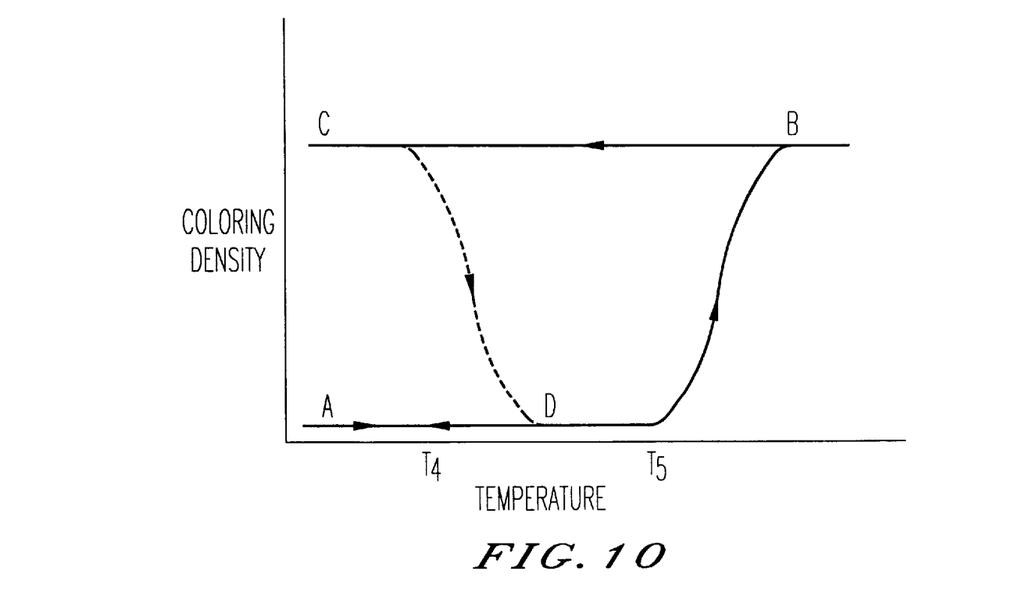
FIG. 10 is a graph which shows the change in the coloring reaction of a reversible thermosensitive recording material depending on the heat.

The principle of color development and decolorization, that is, the image formation and image erasure obtained by using the above-mentioned composition as an image recording medium will be explained by referring to the graph shown in FIG. 10.

The ordinate of the graph indicates the coloring density and the abscissa indicates the temperature, and a solid line represents the image formation process by heating operation, and a dashed line represents the image erasure process by heating operation. A indicates a density in the complete decolorization state; B, a density in the complete color development state obtained by heating to a temperature of $T_5$ or more; C, a density in the complete color development state at a temperature of $T_4$ or less; and D, a density obtained by heating to a temperature between $T_4$ and $T_5$ to cause decolorization.

This composition is in a colorless state (A) at a temperature of $T_4$ or less. To carry out the recording operation (image formation), the composition is heated to a temperature of $T_5$ or more by use of a thermal head or the like to induce color development (B), thereby forming a recording image. This recording image is maintained as it is (C) and memory properties of the recording are not lost when the temperature is returned to $T_4$ or less, along the solid line.

Then, to erase the recording image, the formed recording image is heated to a temperature between $T_4$ and $T_5$, lower than the color development temperature, thereby obtaining a colorless state (D). This colorless state is maintained as it is (A) when the temperature is returned to $T_4$ or less. Namely, the forming process of the recording image proceeds in accordance with the solid line ABC, and the recording is maintained at C. Next, the erasing process of the recording image proceeds in accordance with the dashed line CDA, and the erased condition is maintained at A. The behavior characteristics of such formation and erasure of the recording image have reversibility, and these operations can be repeated many times.

The reversible thermosensitive coloring composition comprises a coloring agent and a color developer as essential components. The color development state can be formed by the fusion of the coloring agent and the color developer under application of heat thereto, and on the other hand, the color development state is eliminated by heating to a temperature lower than the color development temperature. The color development state and the decolorization state are maintained in a stable condition at room temperature. The mechanism of such color development and decolorization in the composition is, as previously mentioned, based on the properties that the composition is made amorphous to form a color development state when the coloring agent and the color developer are mixed and fused under application of heat thereto, and on the other hand, the color developer in the composition in the color development state crystallizes out, thereby forming a decolorization state when heated to a temperature lower than the color development temperature.

In this case, since the decolorization process is taken after the thermosensitive layer is heated to a temperature of $T_5$ or more, the particles of the coloring agent and the color developer can be returned to the original condition, which is advantageous when a color development state is newly formed.

The composition comprising a coloring agent and a color developer for general use, for example, a leuco compound with a lactone ring which is a dye precursor, and a phenolic compound capable of exhibiting the color developing action, which are widely employed in the conventional thermosensitive recording sheet, assumes a color development state because of opening of the lactone ring of the leuco compound when they are mixed and fused under the application of heat thereto. In this color development state, the composition assumes an amorphous state in which both are soluble in each other. Such an amorphous color development state exists in a stable condition at room temperature. However, even when the heating operation is carried out again, the crystallization is not caused and the phenolic compound does not separate from the leuco compound, so that there occurs no closure of the lactone ring and the decolorization does not take place.

In contrast to this, the composition comprising the coloring agent and the color developer assumes a color development state when they are mixed and fused under application of heat thereto, and the composition assumes an amorphous state, which exists in a stable condition at room temperature just like the conventional case. In the present invention, however, when the composition in the amorphous color development state is heated to a temperature of the color development temperature or less, that is, a temperature where the coloring agent and the color developer do not come to the fused condition, the color developer crystallizes out, so that the linkage of the color developer with the coloring agent in a compatible condition cannot be maintained, and the color developer separates from the coloring agent. Then, it is considered that the coloring agent is decolorized because the color developer cannot accept an electron from the coloring agent due to the separation of the color developer from the coloring agent caused by its crystallization.

The above-mentioned peculiar behavior of color development and decolorization shown in the thermosensitive coloring composition is affected by the mutual solubility of the coloring agent and the color developer when they are fused under application of heat thereto, the intensity of the both actions in the color development state, the solubility of the color developer in the coloring agent, and the crystallizability of the color developer. In principle, any coloring agent-color developer system that can be made amorphous when fused under application of heat thereto, and that can induce crystallization when heated to a temperature lower than the color development temperature can be utilized as the components of the composition for use in the present invention. Such a composition having the above-mentioned properties indicates endothermic change in the course of fusion, and exothermic change in the course of crystallization according to the thermal analysis. Therefore, the coloring agent—the color developer system applicable to the present invention can be easily recognized by the thermal analysis. In addition, there may exist a third material in the reversible thermosensitive coloring composition for use in the present invention, and it has been confirmed that the aforementioned reversible color development and decolorization behavior can be maintained, for instance, even when a polymeric material is present.

In the thermosensitive coloring composition for use in the present invention, the decolorization results from the crystallization of the color developer and the separation of the color developer out of the coloring agent. Therefore, the selection of the color developer is significant for obtaining excellent decolorization performance.

Next, examples of the color developer preferably employed in the present invention are shown below, but it is not limited to the following examples because the color developer applicable to the present invention can easily be found by the thermal analysis, as previously mentioned.

(1) Organic phosphoric acid compounds represented by the following general formula (1).

$$R_1\text{—}PO(OH)_2 \tag{1}$$

(wherein $R_1$ represents a straight-chain or branched alkyl group or alkenyl group having 8 to 30 carbon atoms.)

As the specific examples of the organic phosphoric acid compound, for example, the following can be shown: octylphosphonic acid, nonylphosphonic acid, decylphosphonic acid, dodecylphosphonic acid, tetradecylphosphonic acid, hexadecylphosphonic acid, octadecylphosphonic acid, eicosylphosphonic acid, docosylphosphonic acid and tetracosylphosphonic acid.

(2) Organic acids having hydroxyl group at the carbon atom of the α-position, represented by the following general formula (2).

$$R_2\text{—}CH(OH)COOH \tag{2}$$

(wherein $R_2$ represents a straight-chain or branched alkyl group or alkenyl group having 6 to 28 carbon atoms.)

As the specific examples of the organic acid having hydroxyl group at the carbon atom of the α-position, for example, the following can be shown:

α-hydroxyoctanoic acid, (α-hydroxydodecanoic acid, α-hydroxytetradecanoic acid, α-hydroxyhexadecanoic acid, α-hydroxyoctadecanoic acid, α-hydroxypentadecanoic acid, α-hydroxyeicosanoic acid, and α-hydroxydocosanoic acid.

The coloring agent for use in the present invention is a compound exhibiting an electron accepting property, such as a dye precursor which is colorless or light-colored in itself. The coloring agent is not particularly limited, and for example, conventionally known compounds such as triphenylmethane phthalide compounds, fluoran compounds, phenothiazine compounds, leuco auramine compounds, rhodamine lactam compounds, spiropyran compounds and indolinophthalide compounds can be employed. As the specific examples, the following can be shown:
3,3-bis(p-dimethylamimophenyl)-phthalide,
3,3-bis(p-dimethylaminophenyl)-6-dimethylaminophthalide (Another name: Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-{N-(3'-trifluoromethylphenyl)amino}-6-diethylaminofluoran,
2-{3,6-bis(diethylamino)-6-(o-chloroanilino) xanthylbenzoic acid lactam},
3-diethylamino-6-methyl-7(m-trichloromethylanilino) fluoran,
3-diethylamino-7-(o-chloroanilino)fluoran,
3-dibutylamino-7-(o-chloroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-(N,N-diethylamino)-5-methyl-7-(N,N-dibenzylamino) fluoran, benzo leuco methylene blue,
6'-chloro-8'-methoxy-benzoindolino-spiropyran,
6'-bromo-2'-methoxy-benzoindolino-spiropyran,
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'-methylphenyl)phthalide,
3-(2'-methoxy-4'-dimethylaminophenyl)-3-(2'-hydroxy-4'-chloro-5'-methoxyphenyl)phthalide,
3-morpholino-7-(N-propyl-trifluoromethylaniline)fluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino) fluoran,
3-diethylamino-5-methyl-7-(α-phenylethylamino)fluoran,
3-diethylamino-7-piperidinofluoran,
2-chloro-3-(N-methoxytoluidino)-7-(p-n-butylanilino) fluoran,
3-(N-methyl-N-isopropylamino)-6-methyl-7-anilinofluoran,
3-dibutylamino-6-methyl-7-anilinofluoran,
3,6-bis(dimethylamino)fluorenespiro(9,3')-6'dimethylaminophthalide,
3-(N-benzyl-N-cyclohexylamino)-5,6-benzo-7-α-naphthylamino-4'-bromofluoran,
3-diethylamino-6-chloro-7-anilinofluoran,
3-N-ethyl-N-(2-ethoxypropyl)amino-6-methyl-7-anilinofluoran,
3-N-ethyl-N-tetrahydrofurfurylamino-6-methyl-7-anilinofluoran,
3-diethylamino-6-methyl-7-mesidino-4',5'-benzofluoran,
3-N-methyl-N-isobutyl-6-methyl-7-anilinofluoran,
3-N-ethyl-N-isoamyl-6-methyl-7-anilinofluoran, and
3-diethylamino-6-methyl-7-(2',4'-dimethylanilino)fluoran.

A preferable coloring agent comprises a halogen as a substituent. For instance, the following can be shown as such a coloring agent:
3,3-bis(p-dimethylaminophenyl)-6-chlorophthalide,
3-cyclohexylamino-6-chlorofluoran,
3-cyclohexylamino-6-bromofluoran,
3-diethylamino-7-chlorofluoran,
3-diethylamino-7-bromofluoran,
3-dipropylamino-7-chlorofluoran,
3-diethylamino-6-chloro-7-phenylamino-fluoran,
3-pyrrolidino-6-chloro-7-phenylamino-fluoran,
3-diethylamino-6-chloro-7-(m-trifluoromethylphenyl) amino-fluoran,
3-cyclohexylamino-6-chloro-7-(o-chlorophenyl) aminofluoran,
3-diethylamino-6-chloro-7-(2',3'-dichlorophenyl)amino-fluoran, 3-diethylamino-6-methyl-7-chlorofluoran,
3-dibutylamino-6-chloro-7-ethoxyethylamino-fluoran,
3-diethylamino-7-(o-chlorophenyl)amino-fluoran,
3-diethylamino-7-(o-bromophenyl)amino-fluoran,
3-diethylamino-7-(o-chlorophenyl)amino-fluoran,
3-dibutylamino-7-(o-fluorophenyl)amino-fluoran,
6'-bromo-3'-methoxybenzoindolino-spiropyran,
3-(2'-methoxy-4'-dimethylaminophenyl)-3-(2'-hydroxy-4'-chloro-5'-chlorophenyl)phthalide,
3-(2'-hydroxy-4'-dimethylaminophenyl)-3-(2'-methoxy-5'-chlorophenyl)phthalide, and
2-{3,6-bis(diethylamino)}-9-(o-chlorophenyl) aminoxanthylbenzoic acid lactam.

A further preferable coloring agent is a compound represented by the following general formula (3).

[Chemical formula 1]

(wherein R$_3$ represents hydrogen or an alkyl group having 1 to 4 carbon atoms; R$_4$ represents hydrogen or an amino group which may be substituted; X represents hydrogen, an alkyl group having 1 to 4 carbon atoms or a phenylamino group; m is an integer of 1 or 2; Y represents an alkyl group having 1 to 4 carbon atoms or an alkoxyl group having 1 to 2 carbon atoms; and n is an integer of 1 or 2.)

As the specific examples of the compound represented by the general formula (3), for example, the following can be shown:
3-(N-methyl-N-phenylamino)-7-amino-fluoran,
3-(N-ethyl-N-phenylamino)-7-amino-fluoran,
3-(N-propyl-N-phenylamino)-7-amino-fluoran,
3-{N-methyl-N-(p-methylphenyl)amino}-7-amino-fluoran,
3-{N-ethyl-N-(p-methylphenyl)amino}-7-amino-fluoran,
3-{N-propyl-N-(p-methylphenyl)amino}-7-amino-fluoran,
3-{N-methyl-N-(p-ethylphenyl)amino}-7-amino-fluoran,
3-{N-ethyl-N-(p-ethylphenyl)amino}-7-amino-fluoran,
3-{N-propyl-N-(p-ethylphenyl)amino}-7-amino-fluoran,
3-{N-methyl-N-(2',4'-dimethylphenyl)amino}-7-amino-fluoran,
3-{N-ethyl-N-(2',4'-dimethylphenyl)amino}-7-amino-fluoran,
3-{N-propyl-N-(2',4'-dimethylphenyl)amino}-7-amino-fluoran,
3-{N-methyl-N-(p-chlorophenyl)amino}-7-amino-fluoran,
3-{N-ethyl-N-(p-chlorophenyl)amino}-7-amino-fluoran,
3-{N-propyl-N-(p-chlorophenyl)amino}-7-amino-fluoran,
3-(N-methyl-N-phenylamino)-7-methylamino-fluoran,
3-(N-ethyl-N-phenylamino)-7-methylamino-fluoran,
3-(N-propyl-N-phenylamino)-7-methylamino-fluoran,
3-{N-methyl-N-(p-methylphenyl)amino}-7-ethylamino-fluoran,
3-{N-ethyl-N-(p-methylphenyl)amino}-7-benzylamino-fluoran,
3-{N-methyl-N-(2',4'-dimethylphenyl)amino}-7-methylamino-fluoran,
3-{N-ethyl-N-(2',4'-dimethylphenyl)amino}-7-ethylamino-fluoran,
3-{N-methyl-N-(2',4'-dimethylphenyl)amino}-7-benzylamino-fluoran,
3-{N-ethyl-N-(2',4'-dimethylphenyl)amino}-7-benzylamino-fluoran,
3-(N-methyl-N-phenylamino)-7-dimethylamino-fluoran,
3-(N-ethyl-N-phenylamino)-7-dimethylamino-fluoran,
3-{N-methyl-N-(p-methylphenyl)amino}-7-diethylamino-fluoran,
3-{N-ethyl-N-(p-methylphenyl)amino}-7-diethylamino-fluoran,
3-(N-methyl-N-phenylamino)-7-dipropylaminofluoran,
3-(N-ethyl-N-phenylamino)-7-dipropylaminofluoran,
3-{N-methyl-N-(p-methylphenyl)amino}-7-dibenzylamino-fluoran,
3-{N-ethyl-N-(p-methylphenyl)amino}-7-dibenzylamino-fluoran,
3-{N-ethyl-N-(p-methylphenyl)amino}-7-di(p-methylbenzyl)amino-fluoran,
3-{N-methyl-N-(p-methylphenyl)amino}-7-acetylamino-fluoran,
3-{N-ethyl-N-(p-methylphenyl)amino}-7-benzoylamino-fluoran,
3-{N-methyl-N-(p-methylphenyl)amino}-7-(o-methoxybenzoyl)amino-fluoran,
3-{N-ethyl-N-(p-methylphenyl)amino}-6-methyl-7-phenylamino-fluoran,
3-{N-methyl-N-(p-methylphenyl)amino}-6-methyl-7-phenylamino-fluoran,
3-{N-methyl-N-(p-methylphenyl)amino}-6-tert-butyl-7-(p-methylphenyl)amino-fluoran,
3-(N-ethyl-N-phenylamino)-6-methyl-7-(N-ethyl-N-(p-methylphenyl)amino-fluoran,
3-{N-propyl-N-(p-methylphenyl)amino}-6-methyl-7-{N-methyl-N-(p-methylphenyl)amino}-fluoran,
3-{N-ethyl-N-(p-methylphenyl)amino}-5-methyl-7-benzylamino-fluoran,
3-{N-ethyl-N-(p-methylphenyl)amino}-5-chloro-7-dibenzylamino-fluoran,
3-{N-methyl-N-(p-methylphenyl)amino}-5-methoxy-7-dibenzylamino-fluoran,
3-{N-ethyl-N-(p-methylphenyl)amino}-6-methyl-fluoran, and
3-{N-ethyl-N-(p-methylphenyl)amino}-5-methoxy-fluoran.

The color developer is used alone or two or more kinds are used in combination. In addition, as for the coloring agent, it can also be used alone, or a mixture of two or more kinds is applicable.

The thermosensitive coloring composition can be used for a reversible thermosensitive recording portion by forming it into a thermosensitive layer on the support. In this case, the materials for the reversible thermosensitive recording layer, that is, the coloring agent and the color developer are uniformly dispersed or dissolved in water or an organic solvent together with a binder agent by the conventionally known method, and the liquid obtained is coated on the support, thereby obtaining a reversible thermosensitive recording layer.

As the binder agent, a variety of conventional binder agents may be appropriately employed. For example, polyvinyl alcohol, hydroxyethyl cellulose, hydroxypropyl cellulose, methoxy cellulose, carboxymethyl cellulose, methyl cellulose, cellulose acetate, gelatin, casein, starch, sodium polyacrylate, polyvinyl pyrrolidone, polyacrylamide, maleic acid copolymer, acrylic acid copolymer, polystyrene, polyvinyl chloride, polyvinyl acetate, polyacrylic acid esters, polymethacrylic acid esters, vinyl chloride-vinyl acetate copolymer, styrene copolymer, polyester, and polyurethane can be employed.

In the present invention it is possible to add a variety of additive components which are used in the thermosensitive recording sheet for general use, for example, a dispersant, a surface active agent, a filler, a colored image stabilizing agent, an antioxidant, a light stabilizer, a lubricant and the like to the plastic thermosensitive recording portion (image recording portion) when necessary for the purpose of improving the coating properties or the recording characteristics.

Furthermore, the protective layer and the intermediate layer may be provided when necessary, as previously mentioned.

The above-mentioned support (base material), which is not particularly limited, may be a sheet of paper, a sheet of synthetic paper or a plastic film, or a composite material thereof depending on the purpose of use.

We claim:

1. An information and image recording method of recording information in a card and reading said information therefrom and recording an image in said card by using a card reader and writer, which card comprises a rewritable information recording portion, and a rewritable image recording portion comprising a reversible thermosensitive recording material, characterized in that:

the number of times when said information is rewritten in said information recording portion is counted, and said image in said image recording portion is rewritten when said number of rewriting times of said information reaches a predetermined number of times.

2. The information and image recording method as claimed in claim 1, characterized in that information relative to said information to be recorded in said information recording portion and/or information irrelative to said information is recorded in said image recording portion.

3. The information and image recording method as claimed in claim 1, characterized in that part of said rewritable image recording portion is made a write-once recording portion, where write-once recording is carried out.

4. The information and image recording method as claimed in claim 1, characterized in that an area and/or an image recording position of an image recording area is appropriately changed in said image recording portion.

5. The information and image recording method as claimed in claim 1, characterized in that in addition to said rewritable image recording portion an image recording portion comprising a nonreversible recording material is provided, where nonreversible recording is carried out.

6. The information and image recording method as claimed in claim 1, wherein recording is carried out in said card of which said information recording portion comprises magnetic memory, optical memory or IC memory.

7. An information and image recording method of recording information in a card and reading said information therefrom and recording an image in said card by using a card reader and writer, which card comprises a rewritable information recording portion, and a rewritable image recording portion comprising a reversible thermosensitive recording material, characterized in that:

specific quantity information to be recorded in said information recording portion is monitored, and rewriting is carried out in said image recording portion when said quantity information reaches a predetermined value.

8. The information and image recording method as claimed in claim 7, characterized in that information relative to said information to be recorded in said information recording portion and/or information irrelative to said information is recorded in said image recording portion.

9. The information and image recording method as claimed in claim 7, characterized in that part of said rewritable image recording portion is made a write-once recording portion, where write-once recording is carried out.

10. The information and image recording method as claimed in claim 7, characterized in that an area and/or an image recording position of an image recording area is appropriately changed in said image recording portion.

11. The information and image recording method as claimed in claim 7, characterized in that in addition to said rewritable image recording portion an image recording portion comprising a nonreversible recording material is provided, where nonreversible recording is carried out.

12. The information and image recording method as claimed in claim 7, wherein recording is carried out in said card of which said information recording portion comprises magnetic memory, optical memory or IC memory.

13. The information and image recording method as claimed in claim 7, wherein said specific quantity information to be newly recorded in said information recording portion is calculated in terms of the number of points, and said number of newly obtained points is added to the number of previously obtained points which is read from said information recording portion, and rewriting is carried out in said image recording portion when the total number of points reaches a predetermined value.

14. The information and image recording method as claimed in claim 7, wherein a value which is obtained by adding an accumulated value of said specific quantity information read from said information recording portion to said specific quantity information to be newly added is calculated in terms of the number of points, and the rewriting of said image recording portion is carried out when said number of points reaches a predetermined value.

15. An information and image recording method of recording information in a card and reading said information therefrom and recording an image in said card by using a card reader and writer, which card comprises a rewritable information recording portion, and a rewritable image recording portion comprising a reversible thermosensitive recording material, characterized in that:

the timing of rewriting said image in said image recording portion is previously set, and rewriting of said image recording portion is carried out at said rewriting timing.

16. The information and image recording method as claimed in claim 15, characterized in that information relative to said information to be recorded in said information recording portion and/or information irrelative to said information is recorded in said image recording portion.

17. The information and image recording method as claimed in claim 15, characterized in that part of said rewritable image recording portion is made a write-once recording portion, where write-once recording is carried out.

18. The information and image recording method as claimed in claim 15, characterized in that an area and/or an image recording position of an image recording area is appropriately changed in said image recording portion.

19. The information and image recording method as claimed in claim 15, characterized in that in addition to said rewritable image recording portion an image recording portion comprising a nonreversible recording material is provided, where nonreversible recording is carried out.

20. The information and image recording method as claimed in claim 15, wherein recording is carried out in said card of which said information recording portion comprises magnetic memory, optical memory or IC memory.

* * * * *

UNITED STATES PATENT AND TRADEMARK OFFICE
CERTIFICATE OF CORRECTION

PATENT NO. : 5,880,445

DATED : March 9, 1999

INVENTOR(S): Makoto Mori, ET AL.

It is certified that an error appears in the above-identified patent and that said Letters Patent is hereby corrected as shown below:

Column 18, line 6, "methyl-7(m-trichloromethylanilino)" should read --methyl-7-(m-trichloromethylanilino)--.

Column 18, line 39, "6'dimethylaminophthalide" should read --6'-dimethylaminophthalide--.

Signed and Sealed this

Twenty-fourth Day of October, 2000

Attest:

Q. TODD DICKINSON

*Attesting Officer*   *Director of Patents and Trademarks*